(12) United States Patent
Breidenthal (10) Patent No.: US 7,353,797 B1
(45) Date of Patent: Apr. 8, 2008

(54) COMBUSTION CHAMBER FOR INTERNAL COMBUSTION ENGINE

(75) Inventor: Robert E. Breidenthal, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 11/680,489

(22) Filed: Feb. 28, 2007

(51) Int. Cl.
*F02F 3/26* (2006.01)
*F02F 3/28* (2006.01)

(52) U.S. Cl. .................. 123/279; 123/263; 123/661

(58) Field of Classification Search ................ 123/279, 123/263, 262, 276, 281, 282, 293, 661, 193.1, 123/193.2, 193.3, 193.4, 193.5
See application file for complete search history.

(56) References Cited

U.S. PATENT DOCUMENTS

| | | | |
|---|---|---|---|
| 3,229,676 A | | 1/1966 | Ulbing |
| 4,483,289 A | * | 11/1984 | Paul et al. .................. 123/263 |
| 4,570,589 A | * | 2/1986 | Fletcher .................... 123/193.6 |
| 4,742,805 A | * | 5/1988 | Matsushita et al. .......... 123/270 |
| 4,881,513 A | | 11/1989 | Hamanaka |
| 4,893,592 A | * | 1/1990 | Falero ....................... 123/79 C |
| 4,958,604 A | | 9/1990 | Hashimoto |
| 5,065,715 A | | 11/1991 | Evans |
| 5,076,229 A | | 12/1991 | Stanley |
| 5,103,784 A | * | 4/1992 | Evans .......................... 123/279 |
| 5,109,816 A | | 5/1992 | Sasaki |
| 5,224,449 A | | 7/1993 | Fukano |
| 5,771,872 A | | 6/1998 | Ueda |
| 6,152,122 A | * | 11/2000 | Hampson et al. ............ 123/661 |
| 6,158,410 A | * | 12/2000 | Piock et al. ................. 123/301 |
| 6,199,544 B1 | | 3/2001 | Feuling |
| 6,237,579 B1 | | 5/2001 | Singh |
| 6,338,327 B1 | * | 1/2002 | Ogi et al. .................... 123/257 |
| RE37,714 E | | 5/2002 | Ueda et al. |
| 6,494,178 B1 | | 12/2002 | Cleary |
| 6,588,396 B1 | | 7/2003 | Cleary |
| 6,708,666 B2 | | 3/2004 | Roberts, Jr. |
| 2005/0229897 A1 | | 10/2005 | Zoller |

OTHER PUBLICATIONS

Breidenthal, R.E., et al., "Molecular Mixing Via Jets in Confined Volumes," Journal of Fluid Mechanics 219:531-544, 1990.

* cited by examiner

*Primary Examiner*—Mahmoud Gimie
(74) *Attorney, Agent, or Firm*—Christensen O'Connor Johnson Kindness PLLC (57) ABSTRACT

A geometry for an IC combustion chamber is disclosed that increases the air-fuel mixing efficiency within the chamber. The piston head includes a squish surface portion for generating a squish jet, and a bowl portion that cooperatively with the cylinder head defines a combustion volume. A horizontal channel extends between the squish surface portion and the bowl portion, and is adapted to provide a high-momentum jet into the bowl portion. A transverse channel may also be provided that directs the squish flow toward the horizontal channel, thereby generating a toroidal vortex therein. A premix fuel injector may inject fuel near the upstream end of the horizontal channel. A converging nozzle portion near the distal end of the horizontal channel may increase the flow speed into the bowl portion. A chamber fuel injector is disposed near the downstream end of the horizontal channel.

29 Claims, 8 Drawing Sheets

COMBUSTION CHAMBER FOR INTERNAL
COMBUSTION ENGINE

BACKGROUND

It is well known that improved air-fuel mixing provides advantages in reduced knock, improved emission characteristics and improved combustion efficiency in internal combustion ("IC") engines. In addition to improving the completeness of the fuel combustion, improvements in mixing of the fuel and air allow the engine designer to utilize greater engine compression ratios without producing engine "knock" and, therefore, may further improve engine efficiency.

Improved air-fuel mixing in an IC engine may be achieved by providing a suitable geometry in the combustion chamber, defined generally by the piston and cylinder head, such that during the compression stroke the piston will generate a transverse fluid motion and thereby generate additional turbulence in the combustion chamber. For example, it is known to use a so-called "squish jet" geometry, wherein the piston head and corresponding cylinder head are designed such that one or more peripheral portions of the piston head extend upwardly to substantially fill a corresponding portion of the combustion chamber volume when the piston is near the top of the compression stroke, while recessed portions of the piston head define the actual combustion volume. As the peripheral piston head portion approaches the cylinder head, the air or air-fuel mixture therebetween is pushed out, producing a generally transverse fluid flow in the combustion chamber that increases turbulence and enhances air-fuel mixing.

A prior art example disclosing the use of squish jets to increase turbulence of the air-fuel mixture is U.S. Pat. No. 5,103,784 (hereby incorporated by reference, in its entirety), which discloses a combustion chamber wherein the piston and/or cylinder head have a compression face that defines a bowl portion, and a plurality of squish jet channels arranged about the bowl portion. The channels provide a flow path directing the compressed air-fuel mixture toward the bowl portion. U.S. Pat. No. 6,199,544 (hereby incorporated by reference, in its entirety) discloses a similar apparatus wherein angled squish areas impel the air-fuel mixture toward the center of the combustion chamber. See also, U.S. Pat. No. 6,237,579 and U.S. Pat. No. 6,708,666 (hereby incorporated by reference, in their entirety).

However, prior art squish jet designs do not provide optimal mixing between the air and fuel, and therefore additional improvements in such mixing remain a desirable goal.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An internal combustion engine is disclosed having a combustion chamber cooperatively defined by the cylinder, piston head and cylinder head. The piston head includes a squish surface portion that is adapted to create a squish jet during the compression stroke of the piston. The piston head further includes a bowl portion, and a horizontal channel (i.e., along a plane generally perpendicular to the cylinder axis) that extends from the squish surface portion to the bowl portion.

In an embodiment of the invention a combustion chamber is provided, defined by a cylinder, cylinder head and piston head. The piston head includes a recessed bowl portion that is generally aligned with an inverted bowl portion defined in the cylinder head. The piston head also includes a squish surface portion, and a horizontal channel that extends from the squish surface portion to the recessed bowl portion. The squish jet is thereby directed by the horizontal channel to the recessed bowl portion.

In different embodiments, a fuel injector may be provided near the upstream end of the horizontal channel, near the downstream end of the horizontal channel, and/or directly into the chamber defined by the bowl shaped portions of the piston and cylinder heads.

In an embodiment of the invention, during operation the Damkohler number in the combustion chamber is less than one.

In an embodiment of the invention, during operation the Stokes number in the combustion chamber is less than one.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

A method and apparatus is disclosed that incorporates squish jet mixing to generate a high-momentum jet into a combustion chamber volume, and optionally includes confined duct mixing, to improve mixing performance, thereby reducing emissions and improving combustion efficiency.

A key objective for improving engine efficiency and decreasing emissions of NOx and other undesirable products from internal combustion engines is to improve the air-fuel mixing efficiency in the combustion chamber of a reciprocating engine. In contemplating methods for increasing mixing efficiency, the present inventor considered research relating to fundamentals of confined mixing, and postulated that better mixing can be achieved by directing a squish jet air flow into a transverse duct or channel, and thence into the combustion chamber, generating a single, high-momentum jet flow into the combustion chamber to establish a pair of counter-rotating vortices therein. Fuel may be injected into the combustion chamber near the entry of the high-momentum jet, such that the counter-rotating vortices very rapidly mix the fuel and air in the combustion chamber. In a current embodiment of the invention, the mixing is further enhanced using a vortex generator such as an oblique jet that is directed at an angle into the duct to form a toroidal vortex that substantially fills the duct. Fuel may be injected near the entrance of the duct, for example using a second fuel injector, such that the toroidal vortex in the duct pre-mixes the injected fuel with the air.

It is known that in conventional IC engines, most of the circulation in the air received from the intake process is attenuated by the time the piston reaches top dead center in the compression stroke. Therefore, it is not effective to attempt to induce vortex formation during the intake stroke. For this reason, engine designers have developed a type of combustion chamber with a geometry that includes so-called "squish surfaces" that generate "squish jets" during the piston compression stroke, and in particular near the end of the compression stroke. The piston squish surfaces are typically disposed at or near the periphery of the piston, and project upwardly to approach nearer the corresponding cylinder head surface, such that gasses near the squish surfaces are preferentially displaced, imparting a transverse momentum to the gas in a desired direction.

A novel aspect of the combustion chamber described herein is that a squish jet geometry is provided that produces a squish jet air stream within the combustion chamber that is directed into a horizontal channel (i.e., a channel in a plane generally perpendicular to the axis of the cylinder), and is then directed as a single jet into the portion of the combustion chamber where combustion is intended to occur. Preferably, the single jet is directed near the center of the combustion chamber. A vortex generator may be provided to generate vortices in the duct. In a current embodiment, the vortex generator comprises an air stream that is directed at an oblique angle to the horizontal channel. To provide pre-mixing of fuel and air, fuel may also be injected into the horizontal channel, providing a very good air-fuel mixing environment.

Preferably, the horizontal channel has an aspect ratio of about two, such that a pair of counter-rotating confined vortices is formed in the channel to provide a greatly enhanced mixing environment therein. If premixing is desired, one or more fuel injectors meter fuel into the channel, downstream of the oblique air stream, and the confined vortices aid in mixing the fuel and air within the horizontal channel, producing a relatively uniform air-fuel mixture.

Figure 1:
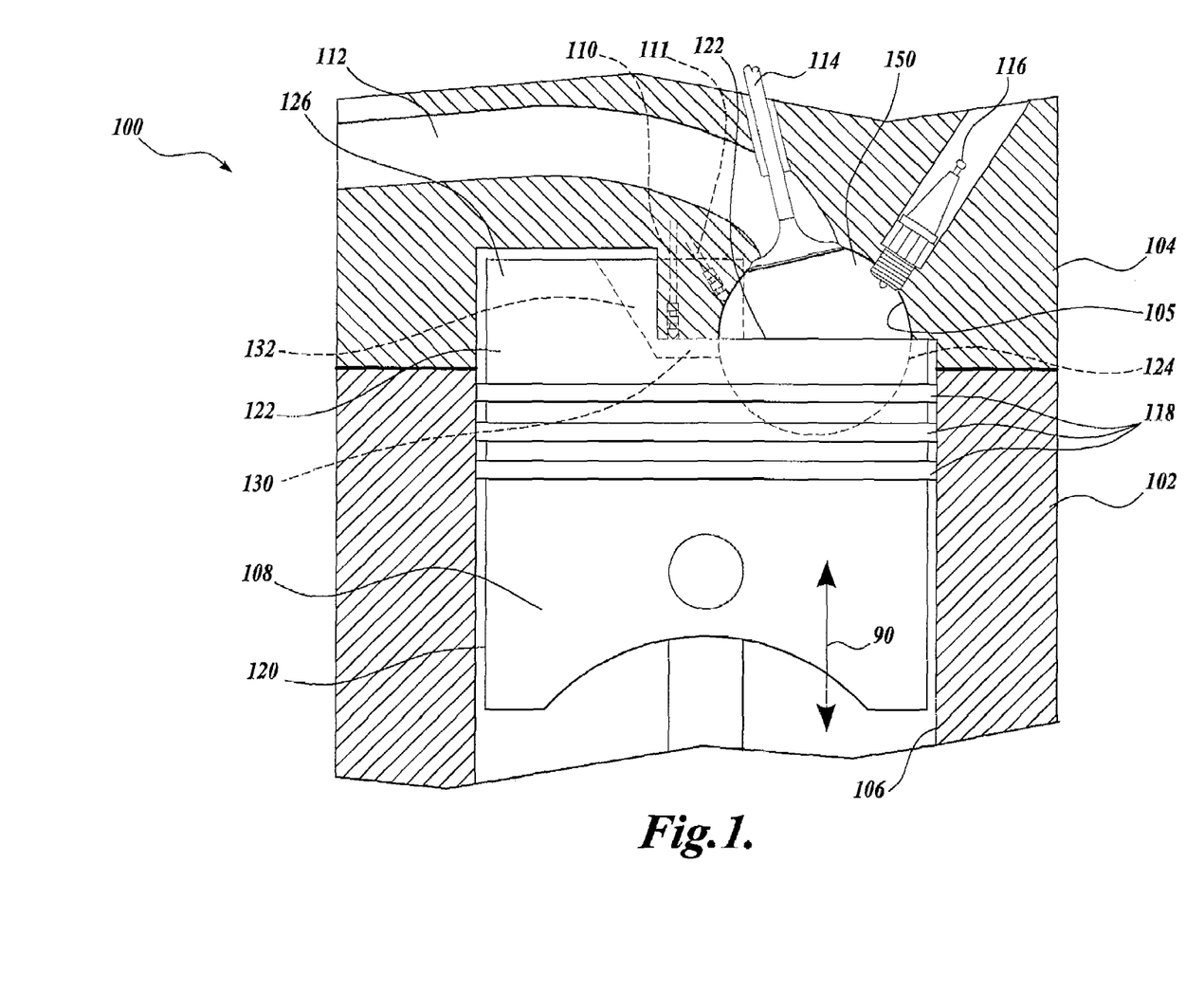
FIG. 1 is a partially cut away side view of a portion of an internal combustion engine that defines a combustion chamber geometry in accordance with the present invention, wherein the cylinder is shown at the top dead center position.

Refer now to FIG. 1, which shows a portion of an internal combustion engine 100, including an engine block 102, a cylinder head 104 sealingly fixed at an upper end of the engine block 102, the engine block 102 defining a plurality of cylinders 106 (one shown), each cylinder 106 having a piston 108 disposed for reciprocating therein as indicated by the arrow 90. Conventional piston rings 118 provide a sliding interface between the cylinder 106 and the piston 108. The piston 108 is shown generally at the uppermost portion of its stroke, i.e., at top dead center.

The cylinder head 104, cylinder 106, and piston 108 cooperatively define a combustion chamber 150 that changes in volume as the piston 108 reciprocates within the cylinder 106. The combustion chamber 150 is described in more detail below. In this exemplary IC engine 100 one or more inlet ports 112 are provided for selectively admitting air into the combustion chamber 150, and one or more outlet ports (not shown) are similarly provided to permit expulsion of the products of combustion and other gasses in the combustion chamber 150. A conventional valve 114 and optional ignition initiator such as a glow plug 116 are also shown, as are well-known in the art. In the exemplary IC engine 100 shown, a premix fuel injector 110 and a chamber fuel injector 111 near the centerline of the combustion chamber 150 are also provided. It is contemplated that in some suitable embodiments only one of the premix fuel injector 110 and the chamber fuel injector 111 would be used.

Particular details of IC engines that are not related to the novelty of the present invention, and are well-known in the art, are not described in detail herein, in order to provide clarity to the description of the novel aspects of the present invention. It will be appreciated that a typical IC engine may include multiple inlet and outlet ports with corresponding valves, an electronic control unit for controlling the amount and timing of the fuel injection, and the like. The timing and control of the inlet and outlet valves may be controlled in a conventional manner such as by utilizing a rotating cam mechanism, and the work may be extracted from the engine, for example, using conventional connecting rods and a crank shaft mechanism.

Figure 2:
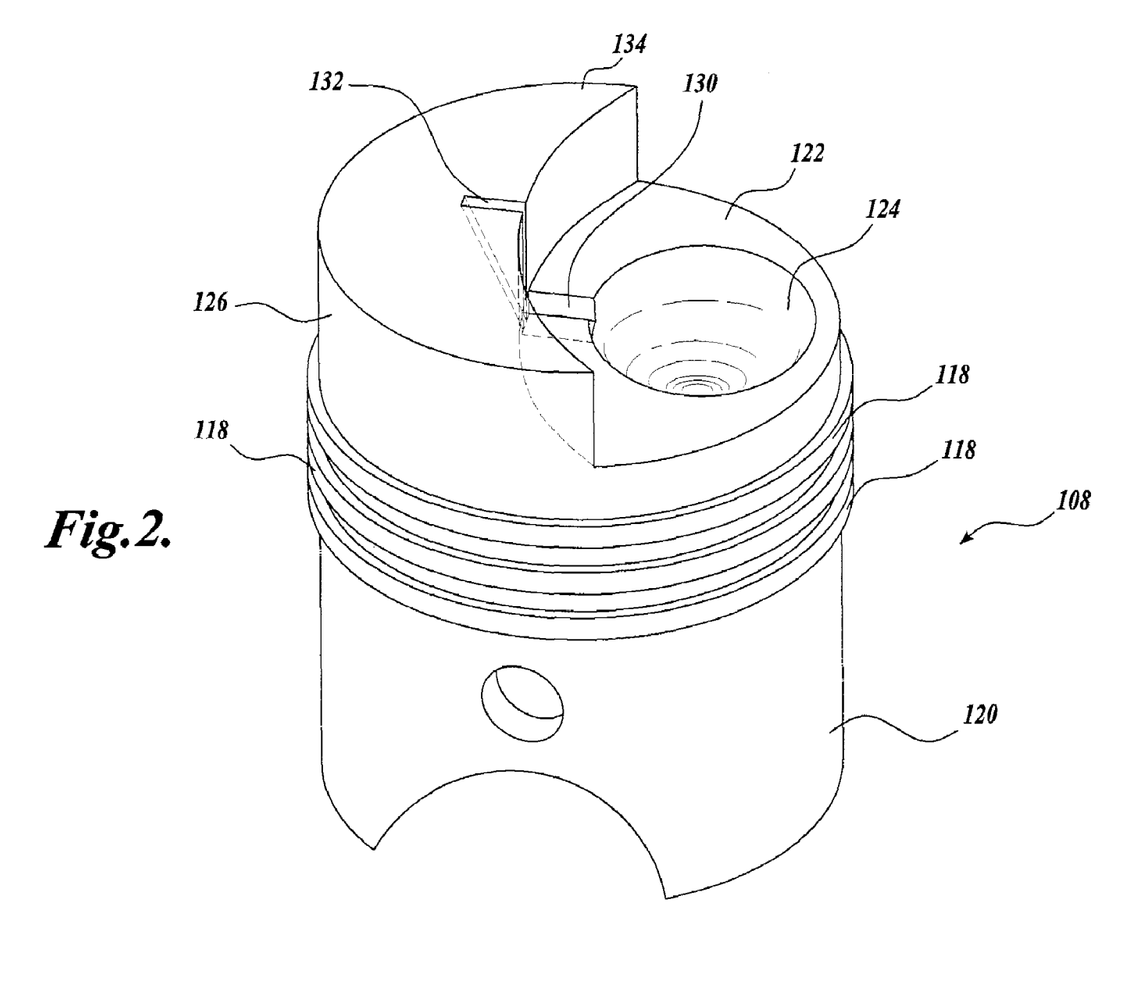
FIG. 2 is a perspective view of the piston shown in FIG. 1.
Figure 3:
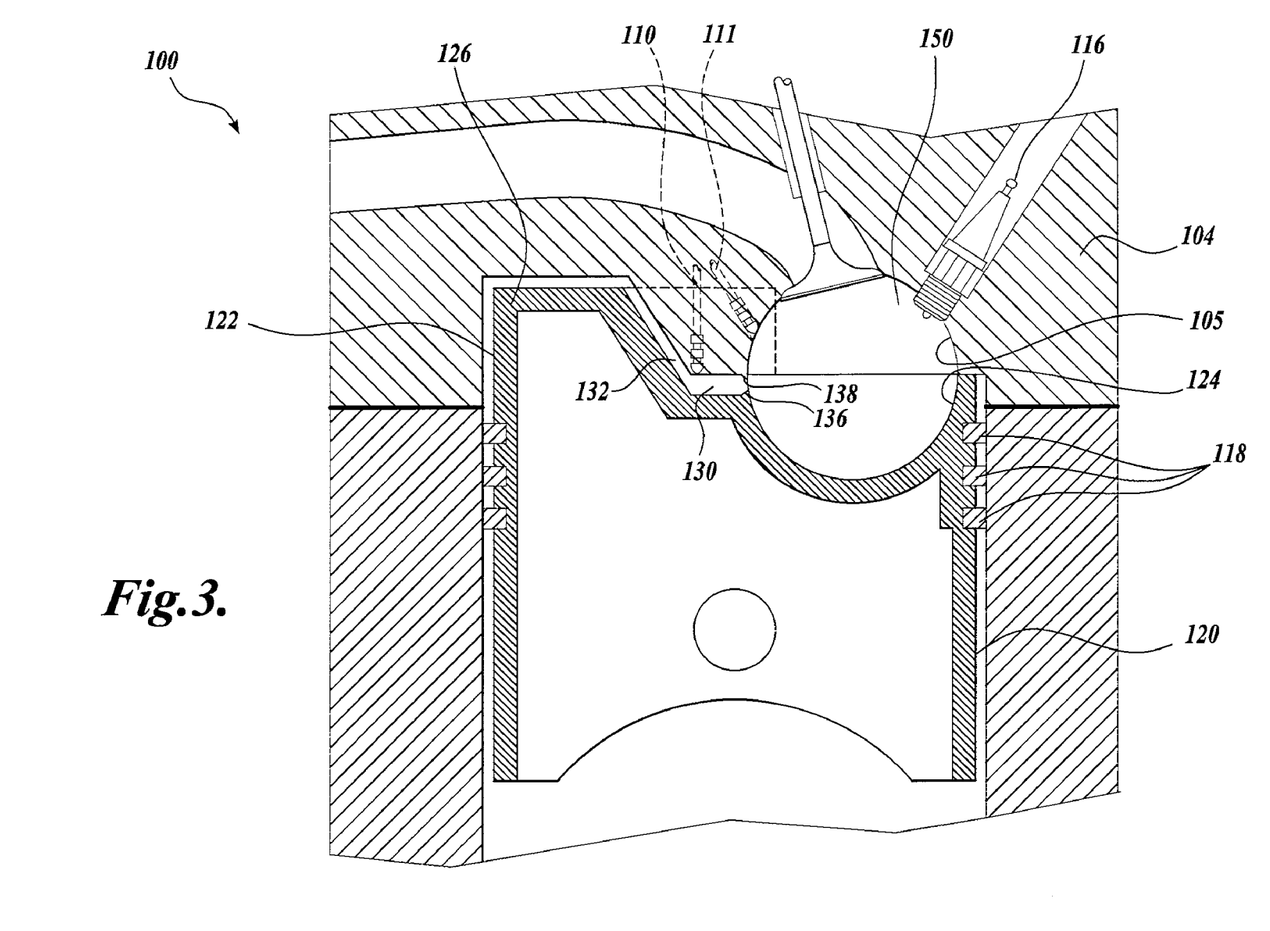
FIG. 3 is a cross-sectional side view of the portion of the engine cylinder and cylinder head shown in FIG. 1.

Refer now also to FIG. 2, which shows a perspective view of the piston 108, and FIG. 3, which shows a cross-sectional side view of a portion of the IC engine 100. The piston 108 includes a generally cylindrical skirt or wall 120 that engages the piston rings 118, and a portion above the rings 118 defining the piston head 122. The piston head 122 includes a recessed bowl portion 124, that is positioned to generally align with an inverted bowl portion 105 formed in the cylinder head 104 (FIG. 1). Although the bowl portion 124 is illustrated as a generally semi-spherical volume, it is contemplated that the bowl portion 124 may be alternatively shaped to optimize engine performance and/or manufacturability, for example having a shallower, more ovoid shape and/or including one or more flat portions.

The piston head 122 further includes an upwardly extending squish surface portion 126 disposed generally toward one side of the periphery of the piston head 122. As will be appreciated from the figures, the squish surface portion 126 is shaped such that as the piston 108 approaches the top dead center position shown in FIG. 1, the air and other gasses disposed over the squish surface portion 126 are forced inwardly, imparting a momentum to the gasses that will facilitate air-fuel mixing in the combustion chamber 150.

A horizontal duct or channel 130 extends generally from a proximal end near the squish surface portion 126 to a distal end opening to the combustion chamber bowl portion 124. It will be appreciated that "horizontal" as used herein is intended to refer to the plane perpendicular to the axis of the cylinder 106. In the embodiment shown in FIGS. 1-3 a vortex generator comprising an angled or transverse channel 132 extends from an upper surface 134 of the squish surface portion 126 to intersect with the horizontal channel 130. It is contemplated that the present invention may be practiced without a vortex generator, or with a vortex generator other than a transverse channel 132. Although in the current embodiment the horizontal channel 130 and the transverse channel 132 are generally rectangular in cross-section, it is contemplated that other channel geometries may be used, and may provide further advantages. As seen most clearly in FIGS. 1 and 3, the premix fuel injector 110 is provided near the upstream or proximal end of the horizontal channel 130.

Figure 4:
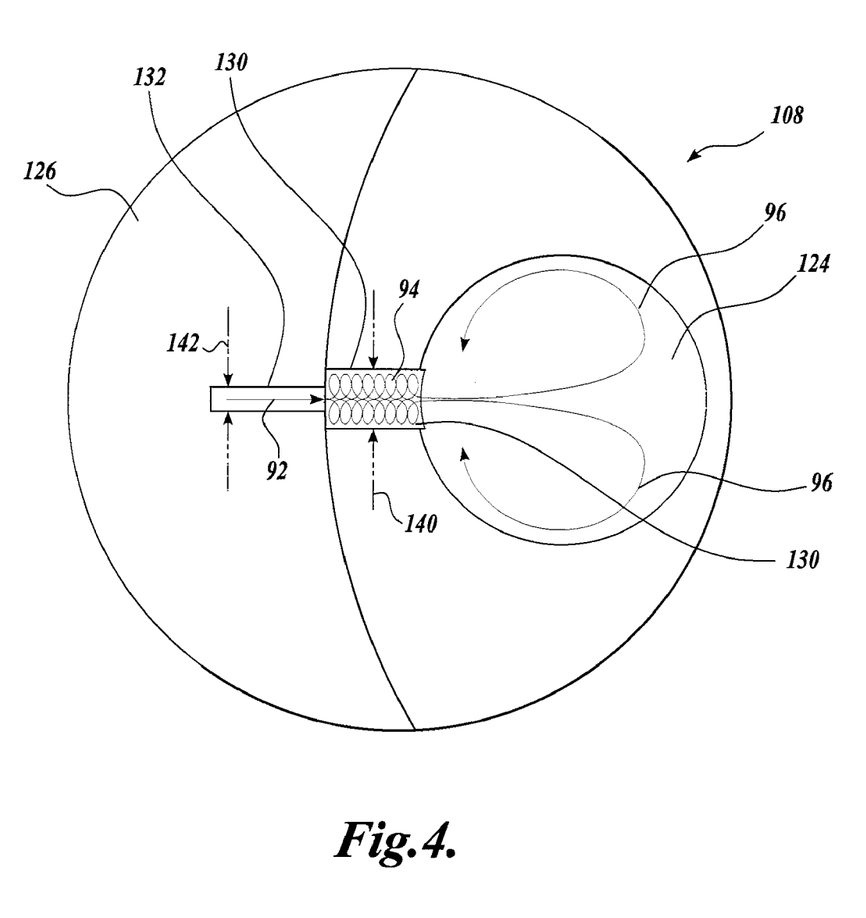
FIG. 4 is a top view of the piston shown in FIG. 1.

Referring now also to the plan view of FIG. 4, it will be appreciated that as the piston 108 moves toward the top dead center position, the squish air displaced by the squish surface portion 126 of the piston head 122 will be at least partially directed into the transverse channel 132, as indicated by arrow 92, and therethrough to the horizontal channel 130. The air stream then proceeds toward the bowl portion 124 via the horizontal channel 130. Airflow from the transverse channel 132 into the horizontal channel 130 will produce a toroidal vortex in the horizontal channel 130, as indicated by arrow 94. The fuel from the premix fuel injector 110 entering the horizontal channel 130 is very rapidly mixed with the air entering from the transverse channel 132, as the air-fuel mixture approaches the bowl portion 124. The air-fuel mixture is then expelled as a high-momentum jet 96 into the bowl portion 124, generating a pair of strong, counter-rotating vortices that are extremely efficient mixers. Additional fuel from the chamber fuel injector 111, as well as fuel in the high-momentum jet 96 is very rapidly mixed with the air in the bowl portion 124.

In a preferred embodiment, the width 142 of the transverse channel 132 is smaller than the width 140 of the horizontal channel 130, and the horizontal channel 130 is approximately twice as wide as it is deep, to accommodate and facilitate the generation of a strong pair of counter-rotating vortices.

As seen most clearly in FIG. 3, in the disclosed embodiment, the horizontal channel 130 in the piston head 122 includes a first lip portion 136, and directly thereabove the cylinder head 104 includes a second lip portion 138, the first and second lip portions 136, 138 cooperatively defining a converging nozzle that increases the velocity of the air-fuel mixture ejected from the horizontal channel 130.

As discussed above, the piston 108 may alternatively be formed without the transverse channel 132 and/or without the premix fuel injector 110 such that the high-momentum jet 94 expelled into the bowl portion 124 comprises essentially inlet air, and fuel is added only through the chamber fuel injector 111. Although FIG. 3 shows the chamber fuel injector 111 on one side of the combustion chamber 150, in an embodiment without the transverse channel 132 the chamber fuel injector 111 may alternatively be positioned to inject fuel into the downstream end of the horizontal channel 130. Injecting the fuel near the downstream end of the horizontal channel 130 would improve the fuel distribution between the pair of counter-rotating vortices 96 (FIG. 4) that are generated in the combustion chamber 150, to further improve air-fuel mixing. It will also be appreciated that placing the fuel injector near the downstream end of the horizontal channel 130 will minimize any tendency of the fuel droplets to centrifuge onto the channel walls, thereby relaxing constraints on the size of the fuel droplets. The chamber fuel injector 111 is positioned to inject fuel into the combustion chamber 150 near the exit end of horizontal channel 130 to provide the best opportunity for the injected fuel to mix with the air prior to combustion.

The preferred embodiment of the present invention includes only a single horizontal channel 130 generating a single high-momentum jet stream into the bowl-shaped portion of the combustion chamber 150. This configuration is believed to be optimal for producing the desired air-fuel mixing because the single jet will produce a strong pair of counter rotating vortices in the combustion chamber.

The following discussion is provided to explain some considerations regarding designing an optimal implementation of the present invention. A Damkohler number is a dimensionless number used in fluids engineering to relate the chemical reaction timescale to mass transport time, and is generally defined to be the ratio of the vortex rotation period to the chemical ignition delay time. In order to achieve good mixing prior to combustion it is desirable that the Damkohler number be less than about one, i.e., that the vortex rotation period in the combustion chamber be less than the chemical ignition delay time.

It is also desirable that the fuel droplets be sufficiently small so that they are not centrifuged out of the vortices onto nearby walls prior to combustion. The Stokes number may be defined as the ratio of the droplet characteristic inertial time scale to the vortex rotation period. It is preferred that the Stokes number be less than about one to avoid significant centrifuging of the droplets.

In the current combustion chamber the final composition of the mixed fluid is controlled by achieving the mixing within a confined channel and/or chamber, whose size is essentially equal to that of the vortex pair or toroidal vortex responsible for the mixing (i.e., the vortices are volume-filling). Within a few rotations, the composition of a vortex core becomes quite uniform. For a symmetric vortex pair, both vortices are essentially identical in composition, as is the entire toroidal vortex. Thus, if a vortex pair or toroidal vortex fills the duct or chamber, the fluid will quickly mix to a uniform composition throughout the entire volume. On the other hand, if the vortices do not fill the duct or chamber, the composition of the mixed fluid will vary widely.

The final mixture composition is selected by controlling the flows of fuel and air into the confined duct or chamber. By combining the confined mixing and metered reactant flows, the mixed fluid will produce a relatively well-mixed air-fuel mixture, as is optimal for fuel economy and emission reduction.

In order to achieve large, volume-filling vortices the momentum of the squish flow is exploited to stir the reactants. It is contemplated that alternatively a separate source of high-pressure air may be used instead of squish flow, such as a separate piston-cylinder assembly, a turbocharger, a supercharger, a compressor, or the like.

In the embodiment wherein the toroidal vortex is formed in the horizontal channel 130, it is contemplated that other vortex generator means may alternatively be used, such as bends in the channel, vane-type vortex generators, or the like.

The optimum aspect ratio of the duct or channel is approximately two, so that the aspect ratio of each vortex is approximately one. The optimum shape of the mixing chamber portion defined between the bowl shaped portions of the cylinder head and the piston head is approximately a sphere or oblate spheroid, such that the aspect ratio of the core of the toroidal vortex is about one.

Figure 5A:
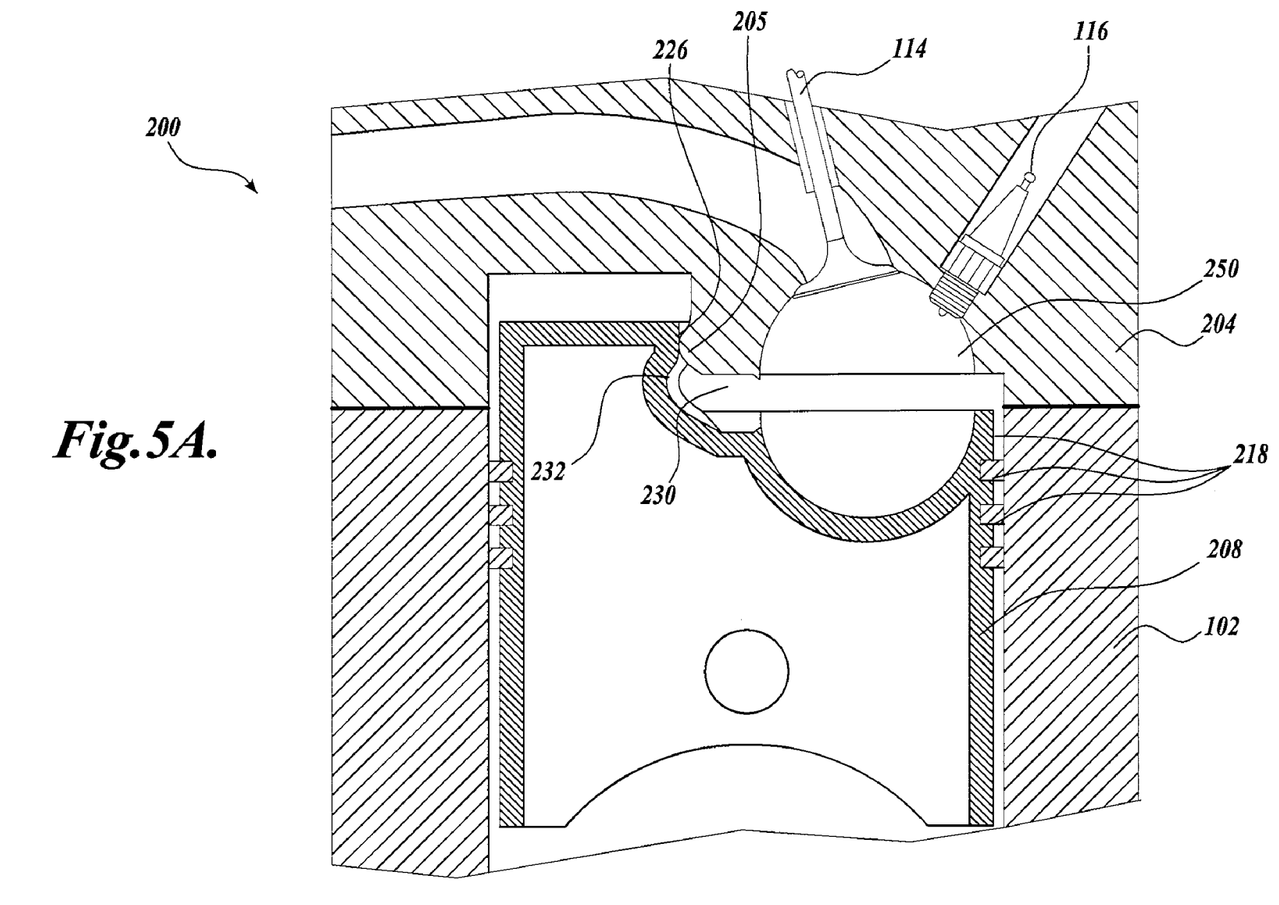
FIGS. 5A and 5B show a cross-sectional side view of a portion of a second embodiment of an internal combustion engine according to the present invention, with the piston before top dead center in FIG. 5A and approximately at top dead center in FIG. 5B.
Figure 5B:
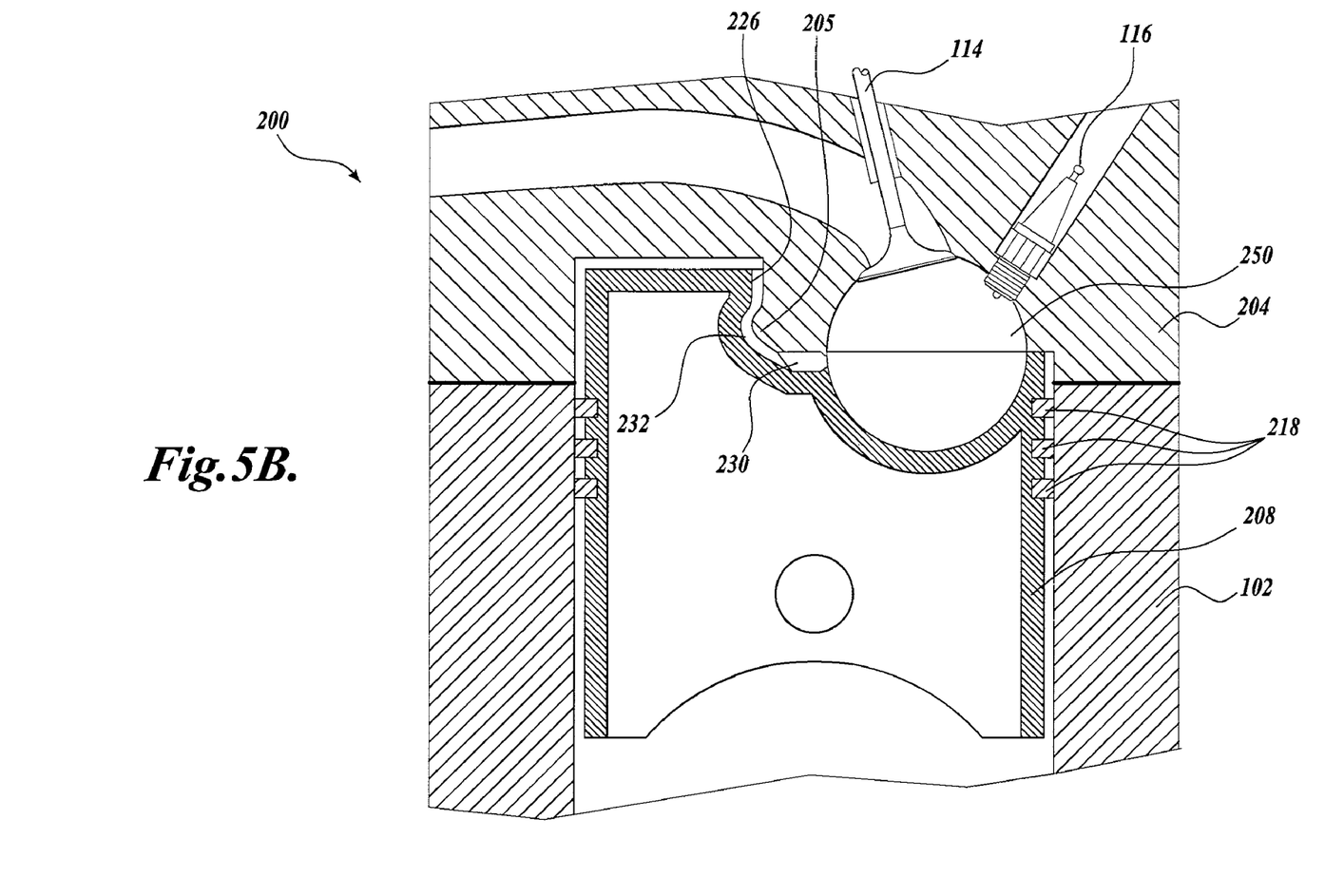

A second embodiment for a combustion chamber 250 for an internal combustion engine 200 according to the present invention is shown in FIGS. 5A and 5B, which show in simplified form a cross-sectional side view of a portion of a second engine similar to the first engine 100. For brevity and clarity, only those aspects of the second embodiment that are different from the first embodiment will be described. In FIG. 5A the piston 208 is shown before top dead center, and includes a horizontal channel 230, and a vortex generator such as transverse channel 232, similar to the horizontal and transverse channels 130, 132 described above. However, in this embodiment the squish surface portion 226 of the piston 208 includes a vertical valve surface 226, that is disposed to approximately align with a projecting portion 205 of the cylinder head 204, such that the squish flow from the squish surface portion 226 is substantially cut off for a portion of the compression stroke. As the piston 208 moves upwardly towards top dead center, the vertical valve surface 226 will pass the projecting portion 205, opening the flow path for the squish jet, thereby automatically timing the squish flow.

Figure 6:
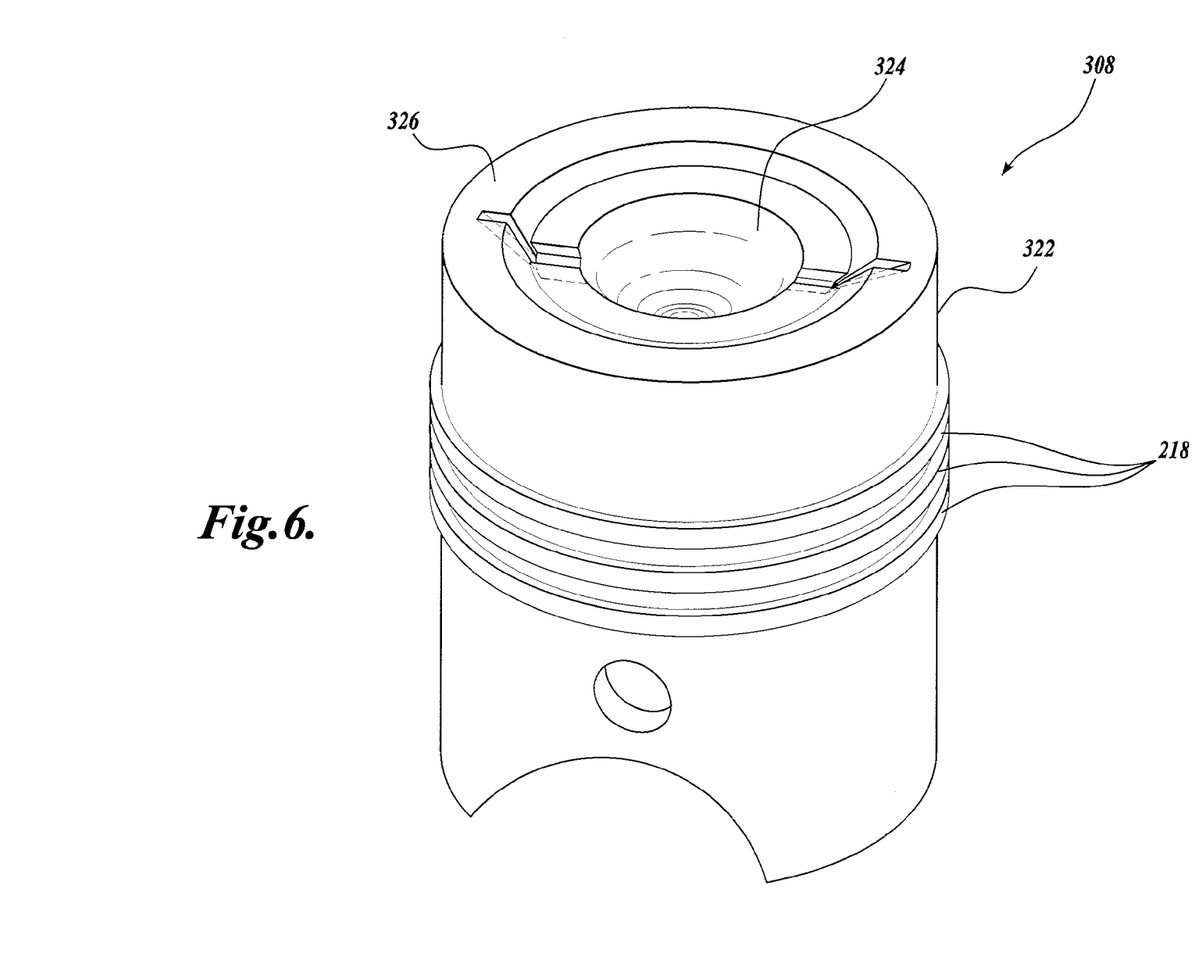
FIG. 6 is a perspective view of a third embodiment of a piston according to the present invention.
Figure 7:
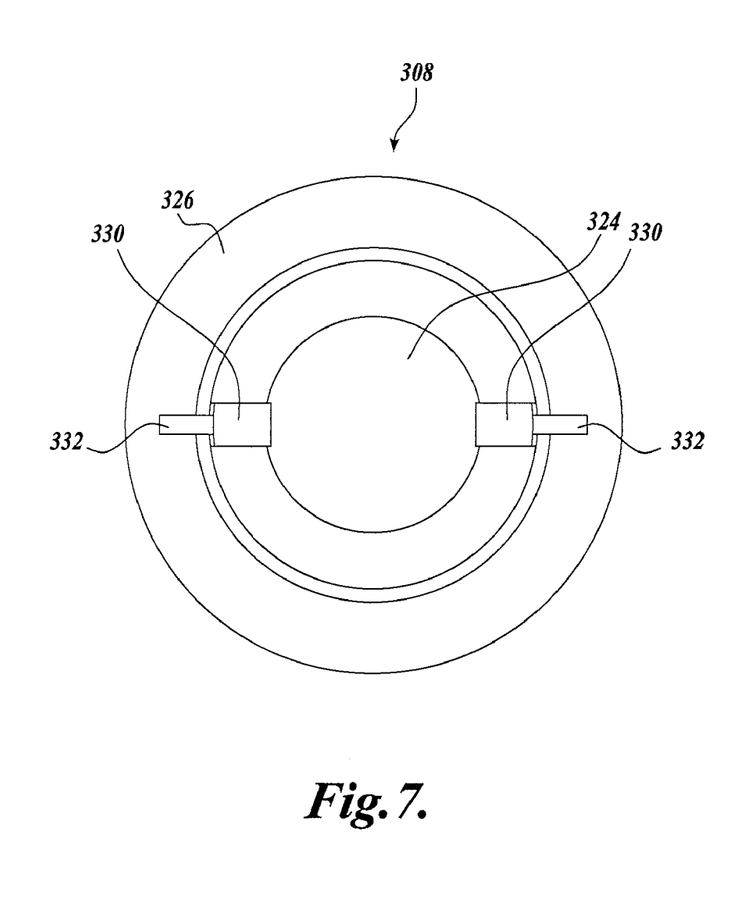
FIG. 7 is a top view of the piston shown in FIG. 6.
Figure 8:
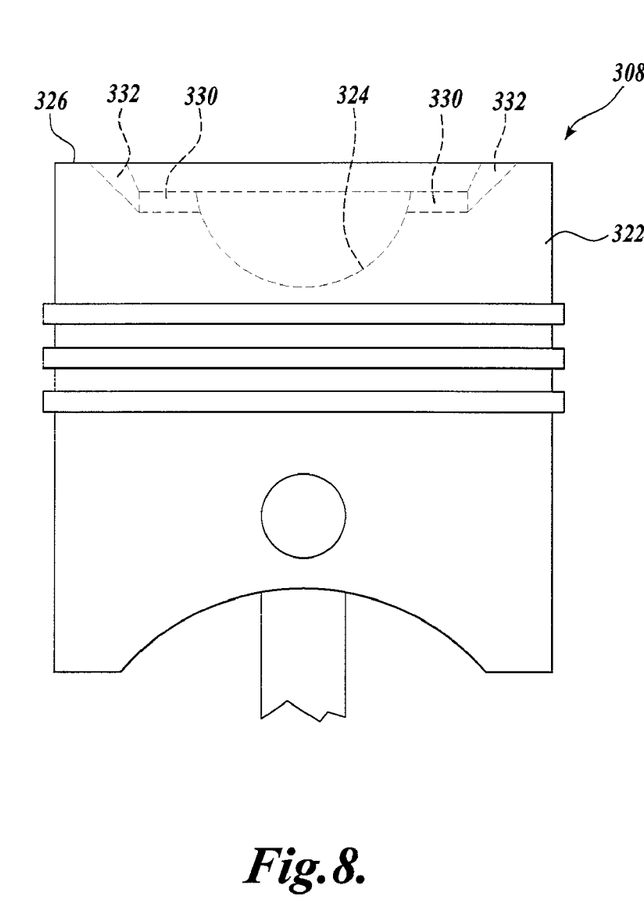
FIG. 8 is a side view of the piston shown in FIG. 6.

A third embodiment of a piston 308 for an internal combustion engine according to the present invention is shown in FIGS. 6, 7, and 8. FIG. 6 shows a perspective view of the piston 308, FIG. 7 shows a plan view of the piston 308 and FIG. 8 shows a side view of the piston 308. In this third embodiment, the rest of the combustion chamber defined by the cylinder and cylinder head (not shown) are substantially the same as that described above, and for clarity and brevity are not described again. In this embodiment, the piston 308 includes a piston head 322 having a central bowl portion 324 with a pair of oppositely disposed horizontal channels 330, each horizontal channel 330 having an associated transverse channel 332 extending from a peripheral squish surface portion 326. In this embodiment, the piston 308 reciprocating in the cylinder (not shown) will produce a pair of squish jets into the central bowl portion 324. Although two oppositely-disposed horizontal channels 330 are shown, it will be appreciated that additional channels 330, 332 may be provided to generate more than two air-fuel jet streams, and/or the horizontal channels 330 may be asymmetrically disposed.

While illustrative embodiments have been illustrated and described, it will be appreciated that various changes can be made therein without departing from the spirit and scope of the invention.

The embodiments of the invention in which an exclusive property or privilege is claimed are defined as follows:

1. A combustion chamber for a direct injection internal combustion engine comprising:
   an engine block defining a cylinder;
   a cylinder head attached to the engine block, the head closing an upper end of the cylinder; and
   a piston adapted to reciprocate in the cylinder, the piston having a piston head, the piston head, cylinder head and cylinder cooperatively defining a combustion chamber;
   wherein the cylinder head includes an inverted bowl portion, and the piston head includes a recessed bowl portion that is adapted to generally align with the inverted bowl portion, the piston head further comprising a projecting squish surface portion and a horizontal channel extending from the squish surface portion to the recessed bowl portion such that a squish jet generated by the squish surface portion is directed through the horizontal channel to generate a high-momentum jet into the recessed bowl portion.

2. The combustion chamber of claim 1, further comprising a fuel injector disposed to inject fuel into the horizontal channel.

3. The combustion chamber of claim 1, further comprising a fuel injector disposed to inject fuel into the recessed bowl portion near a downstream end of the horizontal channel.

4. The combustion chamber of claim 1, wherein the piston head defines exactly one horizontal channel between the projecting squish surface portion and the recessed bowl portion.

5. The combustion chamber of claim 1, wherein during operation the Damkohler number in the combustion chamber is less than one.

6. The combustion chamber of claim 1, wherein during operation the Stokes number in the combustion chamber is less than one.

7. A combustion chamber for a direct injection internal combustion engine comprising:
   an engine block defining at least one cylinder;
   a cylinder head attached to the engine block, the head closing an upper end of the cylinder;
   a piston disposed to reciprocate in the cylinder, the piston having an upwardly-facing piston head, the piston head, cylinder, and cylinder head cooperatively defining a combustion chamber; and
   a first fuel injector positioned to inject fuel into the horizontal channel;
   wherein the piston head comprises a recessed bowl portion, an upwardly-extending squish surface portion, a horizontal channel having a proximal end that intersects the squish surface portion and a distal end that opens to the recessed bowl portion, and a transverse channel that extends downwardly to intersect the proximal end of the horizontal channel.

8. The combustion chamber of claim 7, wherein the horizontal channel is substantially rectangular in cross-section.

9. The combustion chamber of claim 8, wherein the horizontal channel has a width and a depth, and further wherein the width is approximately twice the depth.

10. The combustion chamber of claim 7, wherein the horizontal channel comprises a plurality of horizontal channels, and further comprising a plurality of transverse channels, each transverse channel associated with one of the plurality of horizontal channels.

11. The combustion chamber of claim 7, wherein the cylinder head further comprises an inverted bowl portion that is aligned with the recessed bowl portion of the piston head.

12. The combustion chamber of claim 7, wherein the cylinder head portion defines a projecting portion, and wherein the squish surface portion of the piston head portion includes a vertical valve surface aligned with the projecting portion.

13. The combustion chamber of claim 7, wherein the piston head horizontal channel defines a converging nozzle portion adjacent the recessed bowl portion.

14. The combustion chamber of claim 13, wherein the cylinder head further defines a second converging nozzle portion disposed above the piston head converging nozzle portion.

15. The combustion chamber of claim 7, further comprising a second fuel injector disposed to inject fuel near the distal end of the horizontal channel.

16. The combustion chamber of claim 7, wherein the recessed bowl portion is disposed at the center of the piston head.

17. A combustion chamber for a direct injection internal combustion engine comprising:
   an engine block defining a cylinder;
   a cylinder head attached to the engine block, the head closing an upper end of the cylinder;
   a piston adapted to reciprocate in the cylinder, the piston having a piston head, the piston head, cylinder head and cylinder cooperatively defining a combustion chamber;
   wherein the cylinder head includes an inverted bowl portion, and the piston head includes a recessed bowl portion that is adapted to generally align with the inverted bowl portion, the piston head further comprising a projecting squish surface portion and a horizontal channel extending from the squish surface portion to the recessed bowl portion such that a squish jet generated by the squish surface portion is directed through the horizontal channel to generate a high-momentum jet into the recessed bowl portion; and a vortex generator disposed at an upstream end of the horizontal channel.

18. The combustion chamber of claim 17, wherein the vortex generator comprises a transverse channel in the projecting squish surface portion of the piston head.

19. The combustion chamber of claim 17, further comprising a fuel injector disposed to inject fuel into the horizontal channel.

20. The combustion chamber of claim 17, further comprising a fuel injector disposed to inject fuel into the recessed bowl portion near a downstream end of the horizontal channel.

21. A combustion chamber for a direct injection internal combustion engine comprising:

an engine block defining a cylinder;

a cylinder head attached to the engine block, the head closing an upper end of the cylinder; and a piston adapted to reciprocate in the cylinder, the piston having a piston head, the piston head, cylinder head and cylinder cooperatively defining a combustion chamber;

wherein the cylinder head includes an inverted bowl portion, and the piston head includes a recessed bowl portion that is adapted to generally align with the inverted bowl portion, the piston head further comprising a projecting squish surface portion and a horizontal channel extending from the squish surface portion to the recessed bowl portion such that a squish jet generated by the squish surface portion is directed through the horizontal channel to generate a high-momentum jet into the recessed bowl portion; and further wherein a downstream end of the horizontal channel further comprises a lip portion that defines a converging flow area in the horizontal channel.

22. The combustion chamber of claim 21, further comprising a vortex generator disposed at an upstream end of the horizontal channel.

23. The combustion chamber of claim 21, further comprising a fuel injector disposed to inject fuel into the horizontal channel.

24. The combustion chamber of claim 21, further comprising a fuel injector disposed to inject fuel into the recessed bowl portion near a downstream end of the horizontal channel.

25. A combustion chamber for a direct injection internal combustion engine comprising:

an engine block defining a cylinder;

a cylinder head attached to the engine block, the head closing an upper end of the cylinder; and a piston adapted to reciprocate in the cylinder, the piston having a piston head, the piston head, cylinder head and cylinder cooperatively defining a combustion chamber;

wherein the cylinder head includes an inverted bowl portion, and the piston head includes a recessed bowl portion that is adapted to generally align with the inverted bowl portion, the piston head further comprising a projecting squish surface portion and a horizontal channel extending from the squish surface portion to the recessed bowl portion such that a squish jet generated by the squish surface portion is directed through the horizontal channel to generate a high-momentum jet into the recessed bowl portion; and further wherein the projecting squish surface portion includes valve means for timing the squish flow.

26. The combustion chamber of claim 25, wherein the valve means comprises a vertical valve surface that is disposed to align with a projecting portion of the cylinder head.

27. The combustion chamber of claim 25, further comprising a vortex generator disposed at an upstream end of the horizontal channel.

28. The combustion chamber of claim 25, further comprising a fuel injector disposed to inject fuel into the horizontal channel.

29. The combustion chamber of claim 25, further comprising a fuel injector disposed to inject fuel into the recessed bowl portion near a downstream end of the horizontal channel.

* * * * *